Patented June 14, 1932

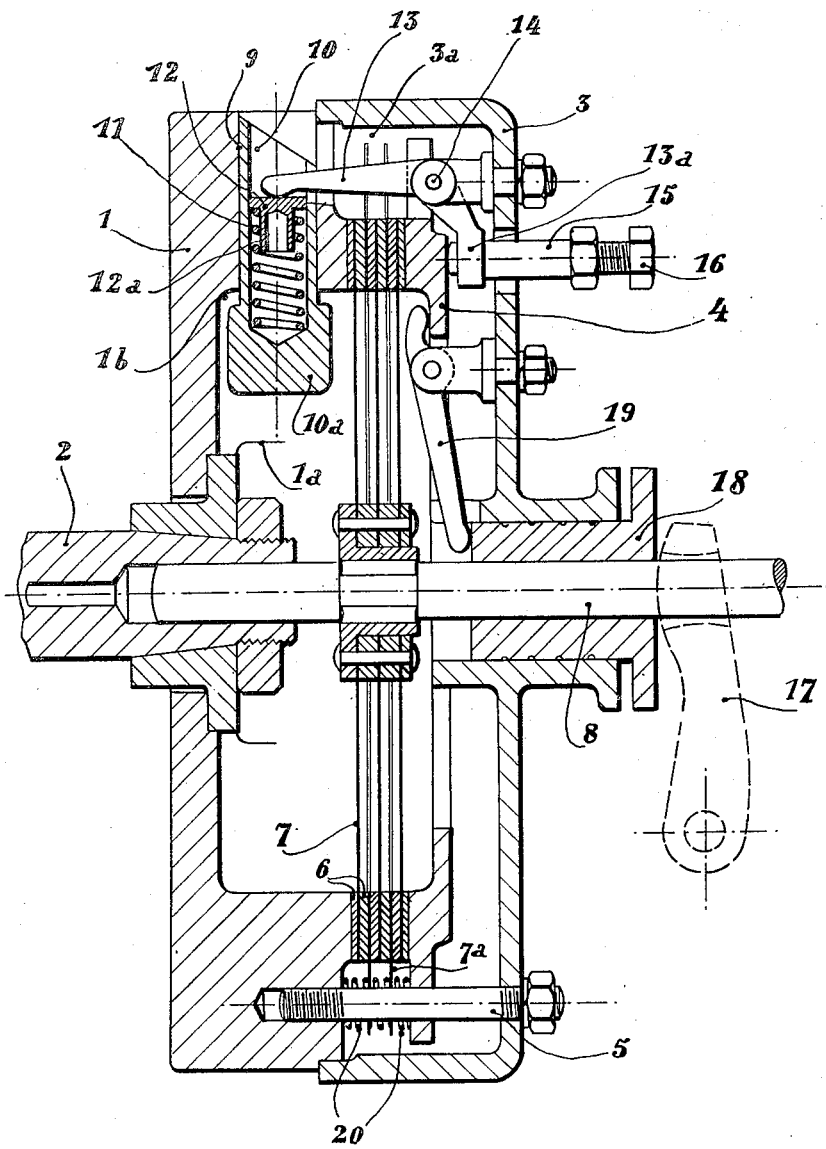

1,862,951

UNITED STATES PATENT OFFICE

PIERRE BIGNAND, OF PARIS, FRANCE, ASSIGNOR TO SOCIETE INDUSTRIELLE DE MECANIQUE AUTOMOBILE ET DE RADIO-ELECTRICITE, OF LEVALLOIS-PERRET, FRANCE

CLUTCH

Application filed November 20, 1929, Serial No. 408,603, and in France July 29, 1929.

Automatic clutches in which springs of two different kinds are used, are well known, the ones using so-called coupling springs continuously tending to connect whilst the others, which are stronger or operate by means of a system of levers to counterbalance the action of the first, always tend to disconnect: their action when the flywheel is in operation is opposed by small masses acted upon by centrifugal force in such a manner that when the speed increases the clutching is effected progressively. The detaching which is effected automatically when the flywheel is at rest may take place when it is in action by means of an ordinary mechanical driving gear.

In other types of clutches the action of small masses also acted upon by centrifugal force, contrarily to what takes place in the device which has just been described, combines with that of the coupling spring instead of neutralizing it.

My invention has for its object a clutch system which involves the use of springs of one kind only, arranged in such a manner that when the flywheel is at rest they do not act upon the clutching element such as a plate, cone and the like, and that when the flywheel is in operation they act progressively by reason of the action exerted upon them by small masses under the action of centrifugal force.

In one mode of application the present clutch is constructed as follows: The springs above described are interposed between a small weight member slidably mounted for radial movement on the flywheel, and a lever capable of forcing the clamping plate into clutched position.

Consequently the present system has the advantage of eliminating in the manner above indicated a number of springs and on the other hand to facilitate assembling owing to the fact that when the flywheel is at rest the springs are extended and not under tension.

Levers arranged in an ordinary manner allow of uncoupling in operation as usual.

In order to prevent pressure upon the clutching surfaces to rise above a given value during operation, the radial displacement of the small weights is limited in such a manner that the springs are not abnormally compressed; the clutching pressure on the clamping plates increases similarly to the square of the speed so much as to insure the complete clutching at a determined speed and then remain constant.

The single figure in the drawing shows a vertical longitudinal sectional view through the clutch.

Referring to the drawing, the numeral 1 designates a flywheel, and which flywheel is mounted on the drive shaft 2 to rotate therewith. The flywheel is of the usual chambered type and connected thereto and rotatable therewith is the housing plate 3 of the clutch, which plate is provided with the usual flange 3a for connecting the same to the flywheel. Disposed within the housing formed by the plate 3 and flange 3a is a clutch clamping plate 4, and which plate is axially guided in its movement on the guide bolt 5 carried by the flywheel. Disposed between the clamping plate 4 and the clutch side of the flywheel 1 are spaced packing members 6, and between which packing discs are disposed the clutch discs 7 and 7a. The discs 7 are carried by the driven shaft 8 and the discs 7a rotate with the flywheel and bolts 5, all of which is conventional structure in clutches, of the disc type.

Slidably mounted for radial movement in relation to the axis of the flywheel and in radial bores 9 of the flywheel are chambered weighted members 10, which members have their inner ends provided with enlargements 10a adapted to form shoulders for engaging the shoulder 1b of the flywheel for limiting the outward movement of the weight members. The inward movement of the weight members are limited by engagement with lugs 1a carried by the flywheel.

The weight members 10 are hollow and disposed in said weight members are springs 11. Disposed on the outer ends of the springs 11 within the weight members are metallic washers 12 having chambered ends 12a, which receive the outer end convolutions of the springs 11 for guiding the washer in its movement in the weight member. The lever 13 is pivoted at 14 on a support carried by the housing plate 3, and overlies and engages the slidable washer within each regular slidable weight member 10. Lever 13 is provided with an inwardly extending arm 13a which overlies the outer face of the clutch clamping plate 4, and has a rearwardly extending extension 15, extending through an aperture in the housing plate 3, and threaded through said extension 15 and arm 13a is a bolt 16, which cooperates with the clamping plate 4, and when adjusted may regulate the pressure upon the plate 4 at a particular speed. In other words, for the clutching operation to take place when the speed of rotation of the flywheel exceeds a predetermined speed and to declutch when the speed of rotation decreases below the adjusted speed.

It will be noted that during the rotation of the flywheel the weighted members 10 are forced outwardly radially in the radial bores 9 of the flywheel, thereby compressing the springs 11 for taking up the shock and the centrifugal action on the weighted members will rock the levers 13, thereby forcing the adjusting screws 16 inwardly for forcing the clamping plate 4 against the discs for a clutching operation, which takes place when a predetermined speed is attained. The drawing shows the device in operative position, however when the device is at rest the centrifugal force is relieved from the weight members 10, thereby allowing the springs 11 to expand until the weight members are moved radially inwardly to the limiting lugs 1a, and at which time the springs 11 are not under tension, therefore the pressure of the screws 16 on the clamping plate 4 is relieved, and the clutch declutched. If desired the declutching can be effected in the ordinary manner by means of the foot lever 17, which cooperates with the sleeve 18 slidably mounted on the driven shaft, and which sleeve engages the inner end of pivoted clutch levers 19. To facilitate this declutching operation coiled expansion springs 20 are preferably provided on the guide bolts 5, and interposed between the discs 7a.

What I claim and desire to secure by Letters Patent of the United States is:

1. The combination with a disc clutch having a clamping plate, a flywheel, bell crank levers cooperating with said clamping plate for a clutching operation, of radially movable centrifugal control weight members slidably mounted in the flywheel and cooperating with arms of the bell crank levers for rocking the same for a clutching operation through the clamping plate, yieldable means in said weight members and cooperating with the arms of the bell crank levers for the clutching operation, said yieldable means forming means for returning the weight members to inner inoperative positions when the speed of rotation of the flywheel is below a predetermined speed.

2. The combination with bell crank levers rockably mounted and cooperating with a clamping plate of a disc clutch, a rotatable flywheel towards which said clamping plate is forced by the bell crank levers for the clutching operation, one of the arms of said bell crank levers extending towards the flywheel, of centrifugally controlled yieldably mounted and radially movable weight members carried by the flywheel in the path of the arms of the bell crank levers extending towards the fly wheel and forming means for rocking said levers for a clutching operation when the flywheel attains a predetermined speed of rotation and spring means carried by said weight members and cooperating with the lever arms for returning the weight members to inoperative positions when the speed of rotation of the flywheel is below the predetermined speed.

In testimony that I claim the foregoing as my invention, I have signed my name.

PIERRE BIGNAND.